United States Patent [19]

Harkins, Jr.

[11] Patent Number: 4,698,258
[45] Date of Patent: Oct. 6, 1987

[54] SURFACE COVERING PRODUCT AND PROCESS THEREFOR

[76] Inventor: Joseph C. Harkins, Jr., 1 Hunters La., Chadds Ford, Pa. 19317

[21] Appl. No.: 865,673

[22] Filed: May 22, 1986

[51] Int. Cl.$^4$ .......................... B32B 5/14; B32B 5/18; B32B 7/00; B32B 17/04

[52] U.S. Cl. ........................................ 428/285; 156/79; 156/209; 156/220; 156/221; 156/250; 427/264; 427/373; 427/375; 428/159; 428/286; 428/298; 428/316.6; 428/317.1; 428/317.7; 428/319.1; 428/319.7

[58] Field of Search ................ 156/79, 209, 220, 221; 427/264, 373, 375; 428/159, 285, 286, 297, 298, 316.6, 317.1, 317.7, 319.1, 319.7

[56] References Cited

U.S. PATENT DOCUMENTS

| | | | |
|---|---|---|---|
| 2,920,977 | 1/1960 | Adams | 428/159 |
| 3,293,094 | 12/1966 | Nairn et al. | 428/159 |
| 3,293,108 | 12/1966 | Nairn et al. | 428/159 |
| 4,100,006 | 7/1978 | Buckley | 156/250 |
| 4,128,688 | 12/1978 | Wiley | 428/159 |
| 4,138,521 | 2/1979 | Brown | 428/159 |
| 4,283,456 | 8/1981 | Creasy | 428/316.6 |
| 4,349,597 | 9/1982 | Fine et al. | 427/373 |
| 4,388,363 | 6/1983 | Fountain | 428/316.6 |
| 4,454,188 | 6/1984 | Penta et al. | 428/159 |
| 4,510,201 | 4/1985 | Takeuchi et al. | 428/316.6 |

FOREIGN PATENT DOCUMENTS

| | | | |
|---|---|---|---|
| 1307239 | 9/1962 | France | 428/317.1 |
| 1315226 | 12/1962 | France | 428/317.7 |

*Primary Examiner*—William J. Van Balen

[57] ABSTRACT

A base web is prepared which has two parallel layers of nonwoven fiber glass webs, each impregnated with a solidified resinous composition and separated from each other by a core layer of an expandable solidified resinous composition which is bonded to the resinous composition used to impregnate the fiber glass webs by a thin integral layer of nonexpandable resinous composition. Additional layers of resinous material, expandable and nonexpandable, and decorative effects may be supported by the base web. The composite web is subjected to heat processing to expand the core layer and other expandable layers that may be present and to fuse the resinous composition used in the construction of the product. The processes are particularly adaptable for the production of shapes such as floor tiles and decorations that employ chemical embossing.

36 Claims, 4 Drawing Figures

SURFACE COVERING PRODUCT AND PROCESS THEREFOR

FIELD OF INVENTION

The present invention relates to products for covering surfaces such as floors, walls, countertops, furniture, rooves, patios and the like and, more particularly, to decorative surface covering products of synthetic resinous materials such as polyvinyl chloride reinforced with inorganic materials such as glass fibers. The invention also relates to processes for producing decorative surface covering products as continuous webs suitable for dividing into individual shapes, i.e. squares or rectangles, for application to floors and walls and other surfaces.

BACKGROUND OF THE INVENTION

U.S. Pat. Nos. 3,293,096, Nairn et al, 3,293,108, Nairn et al, and 2,920,977, Adams, describe products and processes for producing webs by applying a chemically foamable plastisol of polyvinyl chloride resin (PVC) to a substrate such as a web of felted cellulose or mineral fibers. The plastisol is caused to "gel", that is to effect partial solvation of the resin to at least the elastomeric point whereby it becomes like a solid for purposes of subsequent handling. This is accomplished by the application of heat sufficient to achieve temperatures above the gelling temperature of the plastisol but below the temperature at which expansion will occur. A decoration is applied to the web so formed by, for example, rotogravure printing a design onto the surface of the gelled plastisol. A wearing surface is then added to the composite web over the decoration. The wearing surface may be a clear, nonfoamable polyvinyl chloride resinous composition applied in the form of a plastisol. The composite web is then heated to a temperature that causes the foamable plastisol to expand and fuse and the wearing surface or wear layer to solidify and fuse.

In a principal embodiment of the invention described in the Nairn et al patents referred to above, a chemical described as an "inhibitor" is incorporated in one or more of the printing inks applied to the surface of the gelled, expandable plastisol during printing. The inhibitor reduces the amount of subsequent expansion of the gelled, expandable plastisol during the final heating step only in the areas where it is applied. This results in a surface that is fully expanded in all portions except where the inhibitor is applied. A three dimensional or embossed appearance is achieved. The embossing is in perfect register with the color of the printing ink with which the inhibitor is applied.

Products made as described above have achieved world wide commercial success. They have been available in the form of continuous webs ranging in width from six to fifteen feet and lengths determined by convenience of packaging and expected useage. There has not, however, been widespread production of such products in the form of tiles, e.g. squares measureing 9×9 inches or 12×12 inches, even though there is a significant market for tile products. An important reason for this is that, among other things, the construction of products manufactured by the processes described above introduces inherent problems of dimensional instability caused by the growth or shrinkage of the various layers of the composite product after the product has been produced. As an example overall curling can occur because of shrinkage of certain compositions of wear layers when applied over relatively thick layers of expanded resinous compositions. On the other hand many substrates made from cellulose or mineral fibers exhibit growth when exposed to certain moisture conditions which are somewhat high but occur frequently in normal use. Special installation procedures, normally carried out by professional installation mechanics, overcome some of these problems when the product is used in sheet form. For example, adhesive is applied to the surface to be covered as a separate step prior to the installation of the surface covering. As soon as possible after installation another step is preferably performed at the seams that have been created by abutting various pieces of the sheet product as required to completely cover a defined area. The seams are fused together by the careful application of a solvent for the resinous composition along the entire length of each seam. The proper use of the correct adhesive and seam sealing material results in a finished surface that will not curl and has seams that will not shrink open and become unattractive or hazardous. Normally the areas treated by seam sealing materials are visible. It is obvious that this procedure would be acceptable and impractical for an area to be covered by numerous relatively small tiles.

Substrates different from those described above including substrates based on glass fibers have been used to produce surface covering products. The glass fibers are provided in nonwoven web form prepared by a wet laydown process using a small quantity of a resinous binder to secure the fibers in place. U.S. Pat. No. 4,138,521, Brown, describes glass fiber webs used in the surface covering industry and also describes floor covering products using such webs. One of the products comprises a glass fiber web impregnated with a gelled PVC plastisol for use as a substrate. An expandable or foamable PVC plastisol is applied over the impregnated web and gelled or cured to a solid condition. The composite is subsequently decorated and a wearing surface applied. The sheet is heated to expand and fuse the expandable layer and to fuse the wear layer. In another form a foam layer is additionally applied to the side of the product that is intended to contact the floor.

Although products made with fiber glass substrates instead of cellulose or mineral fiber substrates are less affected by dimensional changes due to the substrate, the resinous compositions used in other layers of the products are subject to dimensional changes. For example wear layer shrinkage can occur upon exposure to normal atmospheric conditions over a period of time. Certain conditions such as high heat will accelerate shrinkage. Formulation and processing techniques known in the art are used to minimize this problem in the construction of surface covering products.

Shrinkage of the top layer of a tile product is more critical than shrinkage of this layer, which is the wearing surface, on a product produced in sheet form. Wear layer shrinkage on a tile product can cause individual tiles to curl out of an adhesive used to bond it to a floor. It can cause the development of open seams around each tile which become recepticles for soil and tripping hazards.

A wear layer adhered directly to a PVC impregnated fiberglass substrate may have good dimensional stability; however, both curl and shrinkage are adversely affected by interposing a foam layer between this substrate and a wear layer. The closer the wear layer is to a properly formulated and processed fiber glass substrate the better anchor the substrate becomes for resisting the inherent tendency of the wear layer to shrink and cause the product to curl. Experience has indicated that the presence of no more than about 0.025 inches in thickness of an expanded PVC foam layer over a PVC impregnated fiber glass substrate is practical in the construction of floor covering products in tile form. In this range formulations can be designed for minimum curl and shrinkage yet enough foam thickness is present to achieve adequate depth of embossing by chemical or mechanical means in those cases where embossing is important to the desired decorative effect. For any given thickness of an expanded or foamed resinous layer, the thicker the wearlayer on top of it, the more pronounced is the tendency to curl and to shrink. On the other hand the combination of a thick expanded resinous layer and a thin wear layer generally results in an unsatisfactory product. The latter combination aggravates the ease with which the product can be punctured by sharp objects or worn through by abrasion.

Surface coverings in tile form that are produced giving recognition to the above constraints are by necessity relatively thin, e.g. some products are constructed with a PVC impregnated fiber glass web of about 0.020 inches in thickness, a foam interlayer of about 0.025 inches, and a wear layer of about 0.007 inches, for a total thickness of about 0.052 inches. The usefullness of such products is severely limited because sufficient material is not present to achieve the structural integrity necessary for many applications. Small irregularities in the subsurface to which the surface covering is applied will show through to the surface. Some irregularities in the subsurface can burst through the surface covering from the pressure exerted in normal use. The top surface is easily punctured from above. Whether in tile or sheet form the products have poor "hand", that is, they are limp and lack the stiffness characteristics that are often desired for surface covering products. These products have especially poor hand when compared to surface covering products directed to use as floor covering but constructed in a more conventional manner. Such products are severely limited in their ability to offer controlled insulating properties or controlled resiliency when used as floor coverings. Tile and sheet products constructed as above are commercially available.

Added thickness can be achieved by placing a PVC resinous composition layer on the back of a product produced with a resinous impregnated fiber glass substrate. This layer may be nonexpanded or it may be expanded as shown in the aforementioned Brown patent. An added layer of expanded composition does little to improve dimensional stability in use. The back foam layer appears to be "working" or continuously moving when exposed to the forces that are experienced in normal use. After a period of time the constant repetition of compression and decompression and the action of the shearing forces causes the product to become loose in spots on the floor. The problem is aggravated at or near seams. Special adhesives are recommended for the installation of products in sheet form haveing a foam layer as the back of the product.

A nonexpanded resinous back layer creates additional problems because of the added mass having inherent tendencies of curl, growth or shrinkage. Both the expanded and nonexpanded back layer help resist show through of subfloor irregularities to some degree. With time however subfloor irregularities begin to show through because of the thermoplastic nature, and thus the maleability, of the back layer of material. Products of this type also have unique adhesion problems and special adhesives are normally required to achieve bonding to a subsurface.

Webs that have thermoplastic surfaces on both sides of an interlayer create special operating problems when it is required to expose the web to high temperatures. Various costly systems must be used to avoid disturbing either the top or the back when heating to achieve gelling and fusion. The use of release paper to carry the web during exposure to heat is one approach that is known in the art as is the use of specially designed "floater" ovens in which a web is processed on a layer or conveyer of air rather than rollers or metal or fabric conveyers.

OBJECTS OF THE INVENTION

It is the object of the present invention to provide a surface covering product in sheet form suitable to be cut into smaller shapes for simplified installation. It is a further object to provide a floor covering product in tile form having improved characteristics of laying flat on the floor after installation and maintaining surface dimensions on the floor when exposed to normal in-use conditions. A further object is to provide a base for a surface covering product that will support a resinous layer capable of being chemically and/or mechanically embossed and which will impart improved resistance to curl and shrinkage to the final product. Another object is to provide a product having improved ability to hide or minimize the show through of subsurface irregularities. Another important object is to provide a process that permits the use of the superior decoration possibilities of chemical embossing in register with a printed design on a floor tile product that has good dimensional stability, the capability of laying flat after installation, the capability of reducing the show through of subfloor irregularities and a thickness and degree of stiffness typical of high quality flooring products. A further object is to provide a surface covering product in tile form having a relatively high degree of stiffness combined with good flexability often described as good "hand". Another object is to provide a surface covering product for use in tile form that can be designed with varying degrees of resiliency and can provide greater insulating properties than is now possible. Another object is to provide a process that is simple to operate and control in contrast to the production of wide width surface covering products.

SUMMARY OF THE INVENTION

The above objects and others which will become apparent hereinafter are attained in accordance with the invention by providing a composite web comprising two parallel layers of nonwoven fiber glass webs each impregnated with a solidified resinous composition and separated from each other by a core layer of solidified resinous compostion which is bonded to the resinous composition used to impregnate the fiber glass layers.

The fiber glass webs are generally prepared by a wet process using equipment similar to a fourdrinier paper machine to continuously form a sheet from the random lay down of glass fibers and a binder therefor. The direction that the web proceeds as it is formed in the manufacturing process is known as the "running direction" or the "machine direction". The direction at a right angle to the machine direction is the "across machine direction". The glass fibers can be selected from a range of from about 5 to 15 microns in diameter, preferably 10 to 13 microns, having a length of from 0.5 inches to 2 inches, preferably 0.75 inches to 1.5 inches. The resinous binder comprises from 10% to 30%, preferably 12% to 25%, by weight of the glass fiber. A group of materials that includes acrylic resins, polyvinyl resins or ureaformaldehyde resins has been found to be particularly useful for the construction of fiber glass webs for use in the present invention. Of these ureaformaldehyde resin binder systems have been found to be most useful. The fiber glass webs suitable for use in the present invention may range in overall thickness from 0.005 inches to 0.030 inches. Fiber glass webs produced as above weigh from 0.45 ounces per square yard to 2.7 ounces per square yard. Fiber glass webs weighing between 1 ounce per square yard and 1.8 ounces per square yard are particularly useful in the present invention.

The non-woven fiber glass webs usually consist solely of the synthetic binder and the glass fibers, although the fibers may be a mixture such as a mixture of glass fibers and synthetic staple, e.g. polyester fibers. The amount of glass fibers should be more than 50% by weight and preferably more than 80%. As used in the description of the present invention "fiber glass web" is intended to include a web that contains some fibers other than glass.

Since many properties such as flexability and ease of processing on particular equipment are affected by the choice of the fiber glass webs it is possible to use fiber glass webs that are of the the same or different thicknesses in the practice of the invention. In most product constructions, however, it is necessary to use fiber glass webs that are of the same fiber and binder content and to place the webs so that the running or machine direction is the same for each of the parallel fiber glass webs.

Fiber glass webs suitable for use in the invention are manufactured by Manville Corporation, Denver, Colo., U.S.A.

The products and processes set forth hereinafter preferably use resinous compositions based on polymers of vinyl chloride. The vinyl chloride polymers can either be simple, unmixed homopolymers of vinyl chloride or copolymers, terpolymers or the like. A number of monomers can be copolymerized with vinyl chloride to obtain special properties such as lower fusion temperatures. The most common comonomer is vinyl acetate. Other resinous systems which are familiar to those skilled in the art such as water base acrylics, synthetic rubber, polyurethanes and the like may be used providing such alternate systems possess the properties required for processing and end use.

The preferred resinous composition used to impregnate the fiber glass webs is comprised of polyvinyl chloride resins, plasticizers therefor, stabilizers and other specialty materials which are familiar to those skilled in the art. Best results have been obtained with a dispersion of resin in a plasticiser in the form of a plastisol. It is also possible to use a water dispersion of resin as in the case of a latex or resin dispersed in an organic solvent as an organosol.

The core layer is comprised of the same material that are used for impregnating the fiber glass webs. The composition may be applied as a plastisol, latex, organosol, dry blend or a preformed sheet. In a preferred embodiment of the invention the composition of the core layer contains in addition to the resin, plasticizer, stabilizer and specialty ingredients, a blowing system that has expanded or is capable of expanding the resinous material of the core layer. The blowing system comprises a blowing agent and usually an accelerator therefor. The blowing agent decomposes and gives off gas when exposed to elevated temperatures causing the resinous system to expand or to foam. The accelerator reduces or narrows the decomposition temperature range of the blowing agent. Blowing systems and compositions and conditions for their use are described in extensive detail in the aforementioned Nairn et al patents and are well known in the art. In the practice of the present invention the preferred blowing system is azodicarbonamide and accelerators therefor such as zinc oxide. The accelerators often also function as heat stabilizers for the composition.

After a blowing system has been activated complicated chemical processes occur involving interaction of the accelerator and the blowing agent and partial decomposition of the reacted and unreacted blowing agent and total decompostion of some of the blowing agent. The materials that remain in a product containing a blowing system after activation are referred to in the description of this invention as the "thermal decomposition products of the blowing system".

In the practice of the invention a first fiber glass web is impregnated with a plastisol comprising polyvinyl chloride resin, plasticizer, stabilizer, filler and materials for adjusting viscosity. The step of impregnation causes the resinous composition to substantially fill all or a portion of the interstices in the fiber glass web which are created by the random lay down and bonding together of the glass fibers as the web is manufactured. In most cases the step of impregnation also results in a coating of material on the top or bottom or both sides of the web being impregnated. The coating which forms an integral layer on the top of the impregnated first fiber glass web is referred to herein as the "first barrier coat". It is relatively thin as compared to other layers of the final product and is normally of the same or similar composition as the composition used to impregnate the fiber glass web.

Impregnation may be accomplished by applying a plastisol which has been adjusted for viscosity to the top surface of a fiber glass web which partially penetrates the fiber glass web and also forms a coating on the top of the web. One method of impregnating and coating in one step is by knife coating the plastisol onto a fiber glass web. By maintaining the viscosity of the plastisol sufficiently high the bottom portion of the web contains less penetrated plastisol than the top portion so that the impregnated and coated web may be passed over carrying rollers without causing a transfer of material through the web onto the rollers.

The procedure of controlling the penetration of the plastisol into the web has special value in the construction of products where it is desired to apply an adhesive to the back of a finished tile product produced by using the base web of the invention prior to installation of the tile. Conventional tile products with preapplied adhesive are known as "self stick" tiles. By impregnating the fiber glass web as described above some of the interstices of the fiber glass web near and at the bottom side of the web remain open. This permits some of the adhesive to penetrate a portion of the web when it is coated on the bottom surface of the tile. In this manner the adhesive creates a much stronger bond between the tile and the subsurface when the tile is installed than if the same adhesive were placed onto a relatively smooth nonporous surface in the conventional manner. This technique permits a wider choice of adhesives to be used in producing a self stick tile and greatly improves the bonding ability of any adhesive selected for this purpose.

It is also possible and sometimes useful to fully impregnate the fiber glass webs. One way to accomplish this is by dipping a fiber glass web into a container of plastisol and then removing the web from the container. Upon removal substantially all of the interstices of the web will be occupied by the resinous composition of the plastisol. In addition plastisol will adhere to the surfaces of the web if, for example, it is pulled vertically from the container. It may be desirable to remove excess material from a web impregnated by dipping before gelling. This can be accomplished by scraping one surface of the web after it is removed from the container with a thin flexible steel blade while passing the web over a fixed or rotating cylinder positioned to carry the web. The lines of contact of the scraping blade on the web and the web on the surface of the cylinder are substantially parallel. The scraping blade may be positioned between a small distance before or after the web first makes contact with the carrying cylinder. The procedure is known in the art and may be controlled to remove excess material from both sides of a dipped web while at the same time providing an integral layer of plastisol on both surfaces of the web for subsequent gelling. One of the integral layers on the surface of the impregnated fiber glass web functions as the barrier coat.

Gelling of an impregnated fiber glass web is sometimes accomplished on a continuous basis in a conventional multistage recirculating hot air oven, an infra red radiation oven, or the like or by wrapping an impregnated fiber glass web around the surface of a rotating heated "gelling drum" which has a smooth surface thereon. Gelling is achieved in an hot air oven by adjusting the temperature of the air which is directed to the web passing through and by adjusting the speed of travel of the web through the oven. Gelling is achieved on a gelling drum by adjusting the speed of rotation, the degree of wrap of the web on the drum and the temperature of the surface of the drum. Such drums, which are well known in the art, may be heated electrically or by delivering and circulating a hot liquid medium such as oil or water to internal portions of the drum for heat transfer through the surface of the drum. Gelling of PVC plastisols may be accomplished by bringing the temperature of the plastisol to 275 degrees F. plus or minus 25 degrees F.

In the preferred embodiment of the invention a second resinous composition in the form of a plastisol containing polyvinyl chloride resin, plasticizer, stabilizer, and a blowing system is applied on top of the first barrier coating on the impregnated first fiber glass web and then heated to gel the second plastisol. The thickness of the plastisol, the nature and quantity of the blowing system, and subsequent processing conditions determine the final thickness of this layer which is referred to herein as the "core layer".

The precentage of the expanded thickness of a foamable plastisol to the unexpanded thickness expressed as a ratio is known as the "blow ratio". In the present invention the blow ratio of the core layer may range from very little, e.g. 1.2 to 1 to as much as 4 to 1. Below 1.2 to 1 there is little benefit to be achieved with respect to control of resiliency or insulating value in surface covering products. If a blow ratio below 1.2 to 1 is desired, it is more economical to eliminate the blowing system altogether. A core layer with a blow ratio above 4 to 1 results in surface covering products, particular flooring products, that are too soft and have poor cell structure in the expanded core layer. This poor cell structure is unsatisfactory for maintaining good recovery from indentation and other characteristics important in the use of a surface covering product.

In order to achieve the special benefits of the invention by using two impregnated layers of fiber glass webs the thickness of the expanded core layer should be at least about the sum of the thickness of the fiber glass webs prior to impregnation. If the thickness of the expanded core layer is too small there is little contribution by that layer to hand, to control of resiliency, to insulating value and to other characteristics described herein which are important to the performance of a surface covering product. If the expanded core layer is too thin performance results are somewhat equal to a single fiber glass layer having a thickness approximating the sum of the two.

One of the factors that determines the maximum thickness of the expanded core layer is the nature of the process used for manufacturing the product. If the process requires that the composite of the two webs of gelled impregnated fiber glass and the gelled core layer be wound up before subsequent processing the thickness of the composite must be less than the thickness that causes unacceptable cracking of the gelled components of the web after winding, unwinding and additional processing. Cracking occurs because the property of distensibility of a fused polyvinyl chloride composition has not been fully developed in the partially solvated or gelled compositions of the composite web. The forces introduced into the composite web at winding are greater than the ability of the gelled composition to resist cracking. The amount of cracking is reduced by increasing the diameter of the core on which the web is wound. Some cracking is acceptable as its effects disappear or are reduced to an acceptable level after subsequent processing.

To determine the maximum thickness of a core layer for a given selection of impregnated fiber glass webs and known processing conditions it is possible to impregnate the fiber glass webs to be used and to gell small samples in a laboratory oven using temperatures for gelling close to those to be experienced in production. Several samples may be made by coating a different measured thickness of the composition of the core layer to be used on several of the samples of the gelled impregnated first fiber glass web. Each sample having a core layer of a different thickness is then gelled in a laboratory oven at a gelling temperature and time about equal to that to be experienced in production. The gelled core layer on each sample is then coated with about 0.010 inches of a liquid plastisol of the composition used to impregnate the second fiber glass web. A second piece of gelled impregnated fiber glass web having the same specifications as that proposed for use in production is laid into the liquid plastisol on each of the samples and the composite is gelled in a laboratory oven at a time and temperature about equal to that to be experienced in processing. Each sample is removed from the oven and permitted to cool until it reaches the winding temperature to be experienced in processing. A 2 inch wide piece of each sample is wrapped around a mandrel for at least about 8 inches of the circumference of the mandrel and secured to the mandrel for a period of 10 minutes. The diameter of the mandrel is that which is expected to be used in production. The degree of cracking is observed. Each sample is removed from the mandrel and coated with 0.010 inches of the liquid resinous composition used to produce the core layer. Each sample is gelled for 90 seconds in a recirculating hot air laboratory oven with a temperature setting of 350 degrees F. Each sample is removed from the oven and cooled to between 70 and 90 degrees F. The top of each sample is coated with 0.010 inches of the liquid plastisol impregnant for the second fiber glass web, eliminating any filler or pigment that may be specified for that composition. Each sample is expanded and fused in a recirculating hot air laboratory oven at a time and temperature setting chosen to approximate actual production conditions to the extent possible. Such conditions will be recognized by those skilled in the art; however, a starting point may be 390 degrees F. for 4 minutes. Time is increased or decreased as necessary to obtain a sample having the core layer and the second expandable layer expanded to the desired blow ratio and a fused top layer. Each sample is observed for visable evidence of cracking defects such as unacceptable lines or the like in the sample. Final judgement as to acceptability is primarily subjective and based on esthetics. Samples are prepared as above until the thickest core layer is established for the fiber glass webs and the operating conditions to be used in the process. Observation of the samples may suggest changes in operating conditions that result in less cracking. It has been found that satisfactory products can be produced from webs with gelled core layers of up to 0.030 inches in conjunction with fiber glass webs each weighing 1.62 ounces per square yard before impregnation to be wrapped onto 18 inch diameter mandrels.

Whether the process requires that the base web be wound up or not, the maximum thickness of the core layer is determined by the desired resiliency, insulating value, hand, cost and the ability of the two fiber glass webs to cooperate to provide satisfactory dimensional stability to the final product. In practice the expanded thickness of the core layer should not exceed about three times the sum of the thicknesses before impregnation of the first and second fiber glass webs. The influence of the combination of fiber glass webs cooperating with the core layer to control dimensional stability of surface covering products is reduced after this point.

The permissible thickness range of the core layer in conjunction with the stability achieved by combination of the impregnated fiber glass webs allows wide flexibility in the amount of resiliency in a surface covering produced using the base web of the invention. Control of this characteristic is particularly important in the production of a flooring product to achieve comfort on the part of the user of the product known as "comfort under foot". Because current floor tile products using expanded resinous composition are severely limited in overall thickness, the comfort under foot contributed by such products to a flooring system is negligible. Conventional floor tile products produced from filled polyvinyl chloride resinous compositions which are not expanded have little resiliency and are not considered to provide significant comfort under foot.

The same limitations on the construction of current products that control insulating value that may be built into a surface covering product. Insulating values will be increased as a mathematical relationship based on the thickness of expanded resinous material in a surface covering product. Most of the currently available floor tile products employ no expanded resinous material in their construction and those that do use only a thin layer of expanded material because of the inherent limitations on these products described heretofore.

After the core layer has been applied to the first barrier coat on the impregnated first fiber glass web and gelled, a plastisol similar to that used to impregnate the first fiber glass web is applied on top of the gelled core layer and allowed to remain in liquid form while a second fiber glass web is placed into the plastisol. The machine direction of the second fiber glass web is parallel to the machine direction of the first fiber glass web. The second fiber glass web settles into the liquid plastisol to a level near the interface of the gelled core layer and the liquid plastisol whereby the second fiber glass web becomes impregnated with the plastisol but is separated from the core layer by an integral layer of the impregnant referred to herein as "the second barrier coat". A layer of plastisol ranging from about 50% to 100%, preferably about 85%, of the thickness of the second fiber glass web is often satisfactory in the production of floor tile to impregnate the second fiber glass web and provide the second barrier coat. The new composite is heated to gel the plastisol and maintained at a temperature below that which will activate the blowing system in the core layer.

The purpose of each of the barrier coats is to provide an integral layer of resinous material to separate the normally expandable core layer and impregnated fiber glass webs and to bond the core layer to the impregnated fiber glass webs. The barrier coat appears to fill or smooth many of the irregularities that are present on the surface of an impregnated fiber glass web that has not been coated and to cover many of the glass fibers that have not been encapsulated by resinous material during impregnation and protrude from an impregnated fiber glass web.

The barrier coats form a strong bond between the expanded core layer and the impregnated fiber glass web after fusion. The compositions of the resinous layers tend to perform after fusion more like a homogeneous composite than a layered composite with marked delamination tendencies at the various interfaces.

Except where especially thick barrier coats are employed some nonencapsulated fibers remain visible through the barrier coat upon close inspection. A barrier coat as thin as 0.001 inches may be used providing a substantially integral layer is formed. It is preferable to apply a barrier coat of about 0.004 inches to about 0.015 inches in order to cover a large number of nonencapsulated glass fibers and obtain a surface relatively free of small pockets or holes. Thicker barrier coats add stiffness to a product, which may be desirable, but a barrier coat should not be thicker than the fiber glass web with which it is associated in order to maintain the maximum impact of the cooperating impregnated fiber glass webs on a final product.

In a preferred embodiment of the invention particularly useful for floor tile products, the composite of the two impregnated fiber glass webs, the two barrier coats and the core layer has an additional coating of plastisol of the type used for the impregnation of the fiber glass webs applied to the top of the composite which is then also gelled. This layer is referred to as a "smoothing layer". The smoothing layer assists in creating a smooth top surface on a flooring product in areas thereof that are not otherwise deliberately disturbed as by mechanical or chemical embossing.

The web comprised of the core layer positioned or "sandwiched" between two nonfoamable layers of resinous material and two impregnated fiber glass webs, with or without a smoothing layer, is referred to herein as the "base web".

The base web prepared as described above may be used for the further construction of surface covering products. In the case of a flooring product that uses chemical embossing as a decorative procedure a plastisol having a blowing system as part of its composition is applied to the top surface of the base web and gelled.

A design is applied to the new composite by transfer printing from a previously printed transfer print paper. At least one of the colors of the design contains an inhibiting material for effecting chemical embossing in accordance with the aforementioned Nairn et al patents. The transfer paper is placed onto the surface of the composite web and under a roller that applies pressure uniformly across the paper. The top gelled surface of the composite has been heated to assist in the transfer of the design. The transfer paper is pulled from the web after passing under the roller and the previously printed design remains on the surface of the gelled plastisol.

There are many other methods of applying a design. For example the composite web may be directly printed with a rotogravure or other type of printed press. Decorative particles of material, some containing inhibitor, can be spread on or in the foamable layer which is above the base web. Many other techniques and systems are known and will occur to those skilled in the art.

The next step in the process is to apply a wearing surface to the decorated composite web. A plastisol containing polyvinyl chloride resin, plasticizer, stabilizer and viscosity controlling materials is prepared and applied to the printed composite web. The new composite is heated uniformly so as to cause the gelled impregnants of the fiber glass webs to fuse, the layers between the impregnated fiber glass webs and the core layer to fuse, the core layer to expand and fuse in the expanded state, the decorated expandable layer to expand and fuse and to exhibit an embossed effect due to differential amounts of expansion caused by the inhibitor, and the wearing surface to fuse.

The achievement of satisfactory expansion of the core layer and the top foam layer in a single heating operation while at the same time also achieving fusion of the other layers of the product is unexpected and remarkable. It would be expected that several different and noncompatible heating requirements for expansion and/or fusion of the various layers would be encountered. It has been determined that it is essential that the barrier coats be present for the single heating step to be effective. Without the barrier coats unacceptable blistering, the formation of "bubbles" at the interfaces of the core layer and the impregnated fiber glass webs and also at the top surface of the product, is encountered. It is also believed although not claimed as a part of the present discovery that the two fiber glass webs somehow function to distribute heat to the layers of the product as the heat is required.

After expansion and fusion the web is cooled. It may then be cut into shapes such as 12 inch by 12 inch squares or 24 inch by 18 inch rectangles and the like. For floor tile it is preferred to cut the web into shapes with the location of the die cut edges in register with the design.

It has been determined that the maximum usefulness of a tile product with respect to actual or apparent dimensional stability is achieved by selecting a design that employs embossing in register whereby the edges of the tile correspond to a portion of the embossed design that is depressed. For example, a foamed and printed web might be prepared with a design of repeating bricks each surrounded by a line of mortar that is depressed with respect to the bricks by chemical embossing. Cutting would be controlled to take place in the depressed areas of the mortar resulting in individual shapes of one or more bricks surrounded by mortar. The periphery of each shape would be depressed with respect to the raised or thicker portions of the brick design. The seams created by the abutment of the shapes after installation would correspond to portions of the design that have little or no expansion above the base web. The area of unexpanded or collapsed resinous material at the periphery of each shape appears to function as a seal around the shape that aids in resisting the internal forces within the shape that contribute to dimensional instability. Additionally there is less opportunity for vertical motion within a shape at the seams as pressure is transferred from one shape to another in the course of normal use.

The surface covering product may be mechanically embossed for decorative or other purposes at any stage of processing that is compatible with the embossing technique employed.

An alternate procedure for producing the products of the invention is to produce a fiber glass web impregnated with gelled resinous composition having a gelled barrier coat thereon. A core layer is then applied to the top of the barrier coat. Next a layer of nonfoamable resinous liquid plastisol is applied on the top of the core layer. A second fiber glass web impregnated with gelled resinous composition is then placed into the liquid plastisol (maintaining the machine direction of the second fiber glass web parallel to the machine direction of the first fiber glass web) and thereafter the composite is gelled. The plastisol on top of the core layer becomes the second barrier coat and bonds the impregnated second fiber glass web to the core layer. The resulting product is a base web which may be further processed as described above.

BRIEF DESCRIPTION OF THE DRAWINGS

The invention will now be described and reference will be made to the accompanying drawings, in which.

SPECIFIC DESCRIPTION AND EXAMPLES

Figure 3:
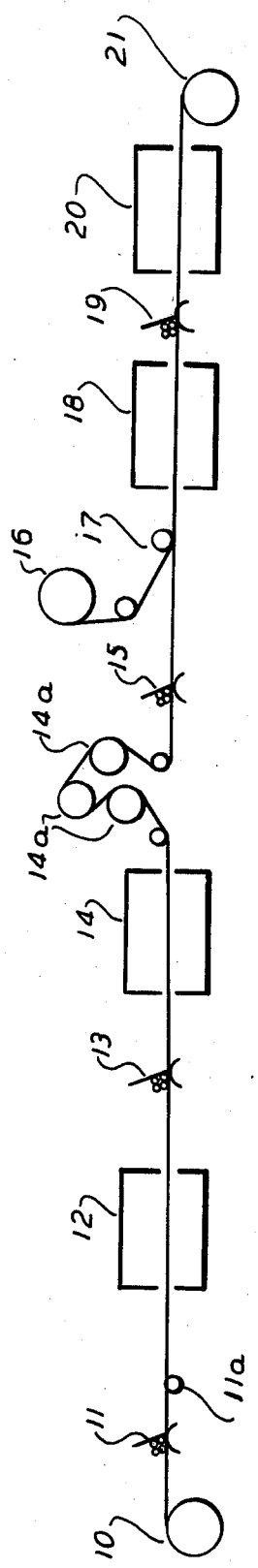
FIG. 3 is a schematic diagram of the process flow of the invention method described herein.
Figure 4:
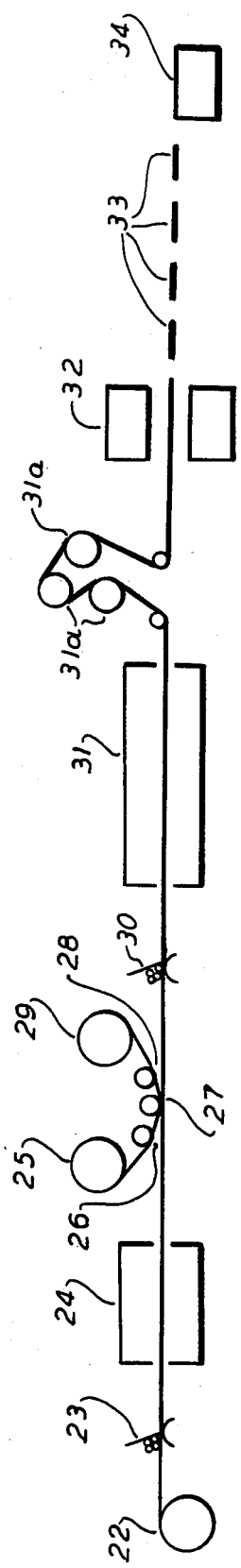
FIG. 4 is a schematic diagram of the process flow of the inventive method described herein as it proceeds from FIG. 3.

FIGS. 3 and 4 set forth a preferred method for using the process of the invention and producing the products of the invention. An example of the product and process of the present invention begins with a fiber glass web 10 which is delivered to a coater 11. The coater for this and other coating operations in the process may be of any type that can apply the plastisols used in the practice of the invention uniformly across the fiber glass web in the desired quantity at the operating speed selected. A knife coater is especially useful on relatively narrow webs such as those less than 60 inches wide although reverse roll coaters and modifications thereof, curtain coaters, roll coaters, knife over roll coaters and the like may be used. A PVC plastisol, described in more detail in the Examples presented hereinafter and designated here as Composition A, is delivered to the coater 11. The coater is adjusted to deliver a quantity of the plastisol to the top of the fiber glass web, some of which penetrates into the intersticies of the fiber glass web, in an amount such that the bottom side of the fiber glass web remains sufficiently dry so that plastisol does not transfer through the web and onto roller 11a but penetrates through most of the thickness of the fiber glass web 10, at least over 50% and preferably over 80%, and in addition forms a thin layer of plastisol on top of the fiber glass web. The viscosity of the plastisol is controlled along with the adjustment of the coater to achieve the desired results by procedures known in the art. For example, small quantities of mineral spirits may be added to reduce viscosity of a plastisol which results in greater ease of penetration for a given plastisol at a given set of coater settings. Materials such as Areosil 200 produced by Degussa Company, Inc. of Teterboro, N.J. may be added in small quantities to a plastisol to increase viscosity in order to limit depth of penetration into the fiber glass web.

The coated and impregnated fiber glass web is delivered to an oven 12. The oven may provide heat by infrared radiation, circulating hot air or the like. A hot air oven is used in this example. Oven temperatures are selected to cure or gel the plastisol. The degree of gelling may be minimal to provide a surface that is able to receive a plastisol at the next coater 13 but sufficient to permit winding of a composite web later in the process. In the example the circulating hot air in an oven 20 feet lon is set at 350 degrees F. An 0.018 inches thick fiber glass web weighing 1.62 ounces per square yard and containing about 20 ounces per square yard of gelled Composition A applied at coater 11 and traveling at a web speed of 30 feet per minute exits the oven with a surface temperature of about 250 degrees F. and sufficiently gelled for the following application of plastisol.

Figure 1:
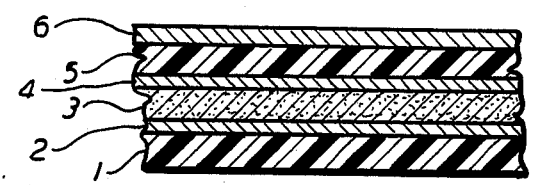
FIG. 1 is a sectional view of a base web as described in the present invention.

In FIG. 1 the fiber glass web impregnated with Composition A is designated as 1 and the thin layer of Composition A, the first barrier coat, coated onto the top surface of 1 is designated as 2.

The oven 12 may be replaced with a gelling drum. In such a case the web 10 is impregnated with plastisol in a suitable manner on a continuous basis, for example by dipping the web in a container of plastisol and scrapping off excess liquid material, and thereafter wrapping the impregnated web around a portion of the hot rotating drum. The drum is hot enough to gel the plastisol and develop a web surface the smoothness of which is controlled by the smoothness of the surface of the hot drum. A drum operated to maintain a drum surface temperature of about 300 degrees F. will provide sufficient gelling by choosing the correct drum diameter, the correct amount of wrap of the web on the drum and controlling the speed of rotation of the drum. When using a gelling drum in accordance with this invention it is not necessary to maintain the back surface of the web free of liquid plastisol because carrying rollers or equivalent devices are not required until the plastisol has become solidified. It is, however, as described heretofore, often useful to maintain less plastisol in the bottom portion of the base web than in the top portion in the preparation of a self stick surface covering product. Certain formulation techniques well known in the art are employed when using a rotating drum to minimize sticking of the web to the drum surface when operating on a continuous basis.

A PVC plastisol, designated herein as Composition B, containing a foaming or blowing system is applied at coater 13 to the coated and impregnated web gelled in oven 12. Composition B is then cured or gelled at oven 14. The curing temperature is below the temperature that will activate the blowing system in the plastisol. The foamable liquid plastisol applied to achieve a gelled thickness of 0.015 inches cures properly when subjected to the conditions specified for oven 12 above.

Gelled Composition B is designated as 3 in FIG. 1.

Prior to the next coating which is to be applied at coater 15 it is preferable to cool the web so that the plastisol applied at coater 15 will not markedly increase in viscosity prior to the lamination of fiber glass web 16 at laminating station 17. Cooling cans 14a shown in FIG. 3 may be used in a continuous process. The cooling cans 14a consist of drums with a liquid medium such as water passing inside thereof at a controlled temperature and velocity to remove sufficient heat from the web to maintain the desired temperature. It is also possible to roll up the web from oven 14 and permit ambient cooling before proceeding with subsequent processing. It is preferred that the temperature of the web not exceed about 100 degrees F. as it enters coater 15.

A PVC plastisol, Composition C, is applied at coater 15 and thereafter a second fiber glass web 16 is laid into the wet plastisol by laminating roll 17. The second fiber glass web is delivered to the laminating roll so that the machine direction of the second fiber glass web is the same as the machine direction of the first fiber glass web 10. The laminating roll 17 directs the web 16 into the wet plastisol in such a manner that the top of the web 16 is at least slightly wet and the main body of the web 16 is positioned within the wet plastisol. In this example the web 16 is 0.018 inches thick and weighs 1.62 ounces per square yard. The liquid plastisol Composition C is applied at coater 15 at a thickness of about 0.015 inches on top of gelled Composition B applied at coater 13. The lamination of web 16 in this quantity of material results in substantially complete impregnation of fiber glass web 16 and at the same time leaves an integral layer of nonfoamable plastisol between the surface of the gelled Composition B and the impregnated fiber glass web 16. This layer of nonfoamable plastisol when gelled is the second barrier coat and is designated as 4 in FIG. 1 and the impregnated second fiber glass web is identified as 5.

Laminating roll 17 may become coated with liquid plastisol as the liquid plastisol passes through the second fiber glass web during lamination. At the same time the laminating roll 17 will redeposit liquid plastisol to the web passing under it in a continuous process resulting in little or no net accumulation on the roll. If a particular formulation of plastisol, or a combination of plastisol with the surface material on the laminating roll, results in an unacceptable build up of liquid plastisol on the laminating roll, excess plastisol may be scraped from the laminating roll and returned to the system for reuse.

Oven 18 receives the composite from laminating roll 17 and is operated to cure or gel the plastisol applied at coater 15. A recirculating hot air oven 20 feet long having the air temperature of 350 degrees F. is operated in this example to provide sufficient curing at 30 feet per minute. An optional and preferred smoothing coating of plastisol, Composition D, is applied at coater 19 and cured in oven 20. When applied in this example at a thickness of about 0.010 inches and cured under the conditions used for the previous ovens the top surface of the impregnated fiber glass web 16 is smoothed and a layer shown as 6 in FIG. 1 is formed.

An optional smoothing roller, not shown on the drawings, may be used after oven 20 for additional smoothness if desired or if necessary to achieve certain design effects. A mechanical embossing roll may also be used at this location for special design effects. In either case the temperature of oven 20 would be controlled to maintain Composition D sufficiently maleable to be smoothed by the ironing effect of a smoothing roller or deformed by the embossing roll.

The web from oven 20 is the base web. It may be further processed without interruption or it may be rolled up at winder 21 for later use.

Whenever it is intended to roll up a web that contains plastisol impregnants or coatings that have been gelled but not fused it is desirable to achieve the highest practical degree of gelling of the various plastisol layers. When a foamable layer is included the composite web must not reach a temperature that will activate the blowing system. If insufficient gelling has taken place the web will exhibit cracking as it is rolled up. Some cracking does not affect the final product depending on the ultimate use and other processing steps. Cracking is also related to the relationship of the thicknesses of the various layers in the composite. Cracking can be minimized or reduced by sufficient gelling as stated and it can also be reduced by winding the web on a core having a diameter large enough to eliminate cracking or reduce it to an acceptable level. A test to evaluate operating conditions on the degree of cracking has been set forth previously.

In the present example the roll form winder 21 is placed at the unwind station 22 of FIG. 4 and the base web is delivered to coater 23. A foamable plastisol, Composition E, specifically formulated to take advantage of chemical embossing as described in the heretofore mentioned Nairn et al patents is applied at coater 23 and gelled in oven 24. In order to achieve the minimum thickness of expanded foam from Composition E that is also considered sufficient for chemical embossing, the application of the liquid plastisol, Composition E, is adjusted to achieve a gelled thickness of from 0.008 to 0.009 inches. Gelling of the plastisol is accomplished in a hot recirculating air oven about 20 feet long set at an air temperature of 325 degrees F. and at a line speed of about 12 feet per minute.

The apparatus 25 to 29 inclusive is used to transfer print a design onto the web coming from oven 24. Roll 25 comprises paper coated with a release or transfer coating which has been rotogravure printed with a multicolor design. One of the colors in the design contains an inhibitor as described in the aforementioned Nairn et al patents which will penetrate the foamable layer onto which it is transferred and inhibit subsequent expansion of the foamable layer at the location of its placement. Since the inhibitor is applied as an ingredient of one or more of the colors of the design the inhibited portion will be in perfect register with the part of the design made up by that color.

The printed transfer paper 25 is passed under roll 26 and is caused to contact the web from oven 24 by a rubber covered roll 27 which presses the transfer paper onto the web which is at a surface temperature sufficient to effect transfer of the design from the transfer paper to the web. Web temperatures adequate for print transfer often range in the area of from 250 degrees F.-3550 degrees F. based on the type of transfer system employed with the printed transfer paper. After the design which is affixed to the transfer paper is transferred to the surface of the gelled Composition E, the paper is passed around roll 28 and wound up at station 29.

A liquid plastisol, Composition F, that provides a transparent wearing surface is applied at coater 30. In this example a thickness of application is chosen to achieve a thickness of 0.010 inches of wearing surface after processing is complete.

Uniform and controlled heating of the composite web from coater 30 is performed in oven 31. During this operation the plastisol layers in the web are brought to fusion temperature whereupon after cooling they develop the expected properties of polyvinyl chloride resin compositions such as tensile strength, tear strength, elasticity, stain resistance, dimensional stability and the like. The foaming system of the core layer in the base web is activated and the core layer expands to a thickness greater than that layer as applied. In this example the thickness of the gelled core layer is increased three times or from 0.015 inches to 0.045 inches. At the same time the blowing system in the foamable layer above the base web having the printed design applied thereto is activated and expansion occurs, also about three times in the example, to about 0.025 inches. In this example the oven is gas fired and uses recirculating hot air. It is about 70 feet long with three sections of about equal length. The first and second sections provide hot air from nozzles located above and below the web passing through. The third section delivers air from nozzles above the sheet only. At a line speed of 12 feet per minute the oven sections or zones are set at air temperatures measured in the plenum near the nozzles of 400 degrees F., 450 degrees F. and 350 degrees F. respectively.

There is a large variation in the performance of industrial ovens when used to expand foamable plastisols. Often trial and error methods are required to establish the best operating conditions for the combination of a particular oven and formulation to be processed. Not only must the best temperature and line speed be established, an oven must also provide uniform results across the width of the oven and along the length of each section. Critical time and temperature relationships to be considered are the time and temperature required to activate the blowing system and to fuse the resinous compositions in the web without causing unacceptable heat degradation of the compositions that are present. Blowing systems for resinous compositions based on azodicarbonamide and an accelerator therefor such as zinc oxide begin activation at a temperature of about 330 degrees F. As is known in the art the presence of the accelerator reduces the activation temperature of the blowing agent thereby permitting lower temperatures to be used for fusion of the associated resinous compositions in a product while at the same time expanding the resinous composition containing the blowing system. The technique of chemical embossing described in the aforementioned Nairn et al patents often involves processing at temperatures above the activation temperature of the blowing system but below the temperature at which activation of the blowing agent occurs in the absence of an accelerator.

A starting point for selecting the operating conditions for a production oven may be established by the use of a laboratory oven. Samples of material to be blown and fused are placed in a laboratory oven set for a temperature estimated to produce the expected results. For resinous systems based on polyvinyl chloride resins and blowing systems based on azodicarbonamide a setting ranging from 370 degrees F. to 395 degrees F. will be satisfactory. A series of samples exposed for different time periods may be examined to establish the preferred time temperature relationship. It is sometimes useful to measure the surface temperature of the preferred sample at the end of the laboratory oven cycle and then adjust the conditions of the operating oven to achieve the surface temperature so recorded. The web from oven 24 in this example required 4 minutes and 50 seconds in a nonrecirculating hot air laboratory oven set at 390 degrees F. to develop satisfactory blowing and fusing.

A unique and unexpected result of the above described process is that the final blowing and fusing operation is able to satisfactorily expand and/or fuse each of the gelled layers comprising the product in a single heat processing step. It is more likely to expect for example that the particular heat requirements for the foamable gel comprising the core layer would be sufficiently different from the requirements of the top foamable layer to make it impossible to process the composite web into a satisfactory product. It is speculated, although by no means established or claimed, that somehow the presence of the two fiber glass webs causes the available heat to be distributed in a controlled manner to the two foamable layers while the nonfoamable layers, including the wearlayer are being fused.

In this example the web from oven 31 is cooled by cooling cans 31a and cut into tiles by die cutting mechanism 32. The cutting is controlled to be in register with the embossed design achieved on the web. For example, a brick design with raised areas constituting the brick and embossed areas constituting mortar surrounding the brick would be cut along the embossed areas of the mortar as described heretofore. The die cut tile is packaged at station 34.

An adhesive may be applied to the back of the web before it is cut into tiles or an adhesive may be applied after the tile is cut. This procedure is customary in the production of floor tile and includes the use of a release paper over the adhesive to protect it prior to use. The release paper is removed at the time of installation. As set forth previously a partial impregnation of the first fiber glass web in accordance with this invention greatly enhances the ability of the adhesive to secure the product of the invention to a surface.

Specific examples setting forth formulations suitable for use in the process described above and variations of it that will be apparent to those skilled in the art are presented as follows:

EXAMPLE 1

A fiber glass web weighing 1.62 ounces per square yard, measuring 0.018 inches in thickness produced by Manville Corporation, Denver, Colo., U.S.A. is impregnated and coated with Composion A comprising a plastisol of:
polyvinyl chloride dispersion resin (Pliovic DR-600, Inherent Viscosity, ASTM D-1243 Method A of 1.2, produced by Goodyear Tire & Rubber Co., Akron, Ohio, U.S.A.): 70 parts
polyvinyl chloride blending resin (Pliovic M-70, Inherent Viscosity, ASTM D-1243 Method A of 0.90, produced by Goodyear Tire & Rubber Co.): 30 parts
dioctyl phthalate: 55 parts
barium, cadmium, zinc phosphate heat stabilizer (Polystab 375 produced by H & N Chemical Co., Totowa, N.J.): 2.5 parts
calcium carbonate (ground to a median particle size of about 10 microns ranging from 2.5 to 25 microns.): 50 parts The above materials are mixed in a high shear type mixer, e.g. a Cowles Mixer, to produce a plastisol. No additives are required in this Example for viscosity control. The plastisol is applied so as to partially penetrate the fiber glass web as described in connection with FIG. 3 above and cured or gelled to provide an overall thickness of 0.022 inches. A thin film of Composition A is present over the surface of the impregnated fiber glass web and measures about 0.004 inches in the example. In FIG. 1 the thin film is represented as 2 and in FIG. 2 after fusion as 2a.

The composite web is then knife coated with the plastisol Composition B comprised as follows:
polyvinyl chloride dispersion resin (Pliovic DR-454, Inherent Viscosity 0.90, ASTM D1243, Method A, produced by Goodyear Tire and Rubber Co.): 70 parts
polyvinyl chloride blending resin (Pliovic M-70): 30 parts
dioctyl phthalate: 52 parts
calcium carbonate filler (Camel White): 15 parts
blowing agent (40% azodicarbonamide produced by Uniroyal, Inc., Naugatuck, Conn., U.S.A., as Celogen AZ ground together with 60% dioctyl phthalate): 5 parts
zinc complex accelerator and stabilizer (81% zinc complex, as octoate, in mineral spirits, produced by H & N Chemical Co. as Polystab 126): 1 part The ingredients are mixed in a Cowles Mixer to produce a plastisol. No additives are required to achieve the correct viscosity for application by a knife coater to the fiber glass web impregnated and coated with gelled and cured Composition A. The overall thickness of the composite web after gelling Composition B is about 0.037 inches.

Composition C, which in this Example 1 is the same plastisol as Composition A, is applied to the above composite at a thickness of 0.015 inches and the second fiber glass web, which in this Example 1 is the same as the first fiber glass web, is placed into the liquid plastisol, Composition C, as described in connection with FIG. 3. The intersticies of the second fiber glass web are substantially filled with Composition C and a portion of Composition C remains as an integral film on the surface of gelled Composition B. The thin film of gelled Compostion C is represented as 4 in FIG. 1 and after fusion as 4a in FIG. 2. The film measures about 0.004 inches but may be as thin as 0.001 inches or it may be thicker to provide added stiffness to a final product. Preferably it should be no thicker than the fiber glass web that is embedded into Composition C to achieve maximum advantage of the fiber glass in the control of dimensional stability characteristics. At this stage the composite web is the base web for use in the construction of other surface covering products.

In the construction of a floor covering product the optional and preferred Composition D is applied as a coating over Composition C on the base web to achieve a smoother or a more textured final product. The thicker and smoother the coating, the smoother the final product. When Composition D is applied as a thin coat, say less than 0.005 inches, or the surface of Composition D is disturbed, as by mechanical embossing prior to gelling or curing, the resulting base web is useful for providing a textured appearance to the surface of a final product produced therefrom. Composition D may be the same as Composition A or C or it may be formulated specially. In this example Composition D is the same as Composition A.

Composition E is applied as a coating over Composition D. In this example it is the same as Composition B and contains the blowing system comprised of azodicarbonamide and zinc complex accelerator necessary to achieve chemical embossing in accordance with the aforementioned Nairn et al patents. It is applied as a liquid plastisol and cured or gelled at a temperature below that which will activate the blowing system. For blowing systems based on azodicarbonamide and zinc complex composition temperatures below 330 degrees F. will normally be satisfactory. The thickness of Composition E, after gelling, in this Example 1 is about 0.008–0.009 inches.

A decorative effect such as a printed multicolored design is applied to the surface of the gelled Composition E, for example by transfer printing as described in connection with FIG. 3. In this Example 1 one of the colors employed in making up the design printed in this manner contains an inhibitor which penetrates the foamable layer Composition E thereby canceling or reducing the effect of the blowing system in the portion of the design made up by that color. Accordingly, after subsequent blowing and fusion of the composite web containing Composition E there is a three dimensional effect created by one portion of the surface of Composition E expanding to a certain thickness and another portion, where the color with the inhibitor was applied, expanding to a lesser thickness.

In the practice of the invention described in the aforementioned Nairn et al patents two inhibitors are widely used in the U.S. for addition to printing inks. One of them, fumaric acid, is difficult to use because it must be finely ground and dispersed into another medium as it is insoluble in the plastisols used in the surface covering industry. The other, trimellitic anhydride, is hydroscopic thus requiring special handling during use and in particular during storage before and after use. Although either of these inhibitors may be used in conjunction with the present invention the embossing effect achieved with them is not as great as is sometimes desired for certain design effects. It has been discovered that a particular inhibitor is especially effective for use with the laminated structure using two glass webs as described in the present invention. Tolyltriazole, 1-H-Benzotriazole, methyl, is soluable at 25 degrees C. up to 41.4% by weight in methyl ethyl ketone, a conventional solvent used in the preparation of printing inks for use in the surface covering industry. It has been discovered that a solution of 25% tolyltriazole in methyl ethyl ketone comprising 80% of an organic solvent based printing ink applied by direct rotogravure printing onto a web as described in this Example 1 results in almost complete inhibition of blowing or expansion at the portion of the design made up by the color containing the tolyltriazole. A wide range of degrees of embossing is possible by using controlled quantities of the inhibitor applied to the surface of the plastisol.

The decorated surface of the composite web is coated with a transparent wearing surface, Composition F, to protect it from damage during use. Composition F is a plastisol comprised of:

polyvinyl chloride dispersion resin (Pliovic DR-600, Inherent Viscosity, ASTM D-1243 Method A of 1.2, produced by Goodyear Tire & Rubber Co., Akron, Ohio, U.S.A.): 100 parts dioctyl phthalate: 50 parts barium, cadmium, zinc phosphite heat stabilizer (Polystab 375): 2.5 parts The above materials are mixed in a high shear type mixer, e.g. a Cowles Mixer, to produce a plastisol. No additives are required in this Example for viscosity control. Composition F is applied to achieve a transparent wearing surface after fusion of about 0.010 inches.

The product produced by the process set forth in connection with the description of FIG. 3 and FIG. 4 using the Composition described in Example 1 above will be described with reference to FIG. 1 and FIG. 2.

FIG. 1 is a cross sectional view of the base web of the present invention. The fiber glass web impregnated with Composition A is designated as 1. The thin integral film 2 is also comprised of Composition A and separates the foamable core layer 3 of Composition B from the impregnated fiber glass layer 1. Layer 4 is comprised of Composition C. Layer 5 is a second web of fiber glass impregnated with Composition C and 6 is a thin integral film of Composition D. In this Example 1 the overall gauge of the base web of FIG. 1 is 0.065 inches. 1 measures about inches, 4 measures about 0.004 inches, 5 measures about 0.018 inches and 6 measures about 0.006 inches. All of the Compositions A to and including D are cured or gelled and ready for further processing.

Figure 2:
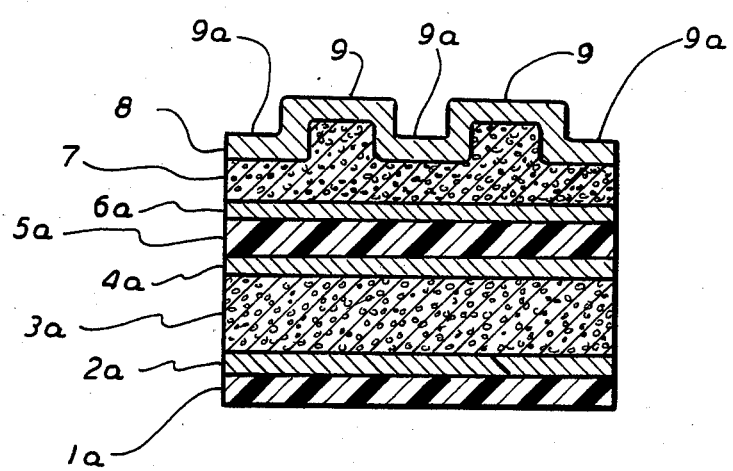
FIG. 2 is a sectional view of a floor tile as described in the present invention.

FIG. 2 is a cross sectional view of a surface covering product produced from the base seb of FIG. 1 after expansion and fusion and cutting into tile form. 1a is the first fiber glass web impregnated with fused Composition A. 2a is a thin layer of fused Composition A. 3a is blown or expanded and fused Composition B. 4a is a thin layer of fused Composition C. 5a is a second fiber glass web impregnated with fused Composition C. 6a is a fused layer of Composition D. 7 is a blown or expanded and fused layer of Composition E. Layer 7 was decorated prior to blowing by the application of a printed design one color of which contained an inhibitor. 8 is the wearing surface comprised of fused Composition F on top of the fused and decorated Composition E. 9a represents the depressed areas of the embossing effect caused by the presence of the inhibitor in a portion of the printed design applied on top of layer 7 prior to blowing and fusion. 9 represents the areas of the design that had no inhibitor present in the printing ink and therefore were fully expanded during blowing and fusion.

The measured thicknesses of the layers of the tile product shown in FIG. 2 using the Compositions and quantities of Example 1 are as follows: 1a is 0.018 inches, 2a is 0.004 inches, 3a is inches, 7 is 0.025 inches and 9 is 0.010 inches which results in an overall thickness of 0.130 inches. The web was cut along lines corresponding with the embossing at 9a into a square tile measuring about 8½ inches by 8½ inches.

The following example set forth formulations of Compositions that may be used in the present invention.

EXAMPLE 2

Composition A:
  polyvinyl chloride dispersion resin (Geon 121, Inherent Viscosity, ASTM D1243-66 of 1.2, produced by B. F. Goodrich, Chemical Group, Cleveland, Ohio, (U.S.A.): 70 parts
  polyvinyl chloride blending resin (VC-260SS, Inherent Viscosity, ASTM D-1243-79 of 0.85, produced by Borden Chemical Division of Borden, Inc., Leominster, Mass., U.S.A.): 30 parts
  butyl benzyl phthalate: 43 parts
  2,2,4-Trimethyl-1,3-pentanediol Diisobutyrate: 12 parts
  barium, cadmium, zinc phosphite heat stabilizer (Polystab 375): 2.5 parts
  calcium carbonate (Duramite, mean particle size 10.0 microns available from Thompson, Weinman and Company, Cartersville, Ga., U.S.A.): 50 parts Composition B:
  polyvinyl chloride dispersion resin (Geon 121, Inherent Viscosity, ASTM D-1243-66 of 1.2, produced by B. F. Goodrich, Chemical Group.): 35 parts
  polyvinyl chloride dispersion resin (Geon 123, Inherent Viscosity, ASTM D-1243-66 of 1.00, produced by B. F. Goodrich, Chemical Group.): 35 parts
  polyvinyl chloride blending resin (Pliovic M-70, Inherent Viscosity, ASTM D-1243 Method A of 0.90, produced by Goodyear Tire & Rubber Co.): 30 parts
  butyl benzyl phthalate: 40 parts
  benzyl type phthalate blend (proprietary plasticizer, produced by Monsanto Co., St. Louis, Mo. as Santisizer 377.): 16 parts
  azodicarbonamide (Modified azodicarbonamide, produced by Uniroyal Chemical, Div. of Uniroyal, Inc., Naugatuck, Conn., U.S.A., as Celogen AZ 3990.) 2 parts
  zinc oxide (Canffelzo 216, average particle size 0.23 microns, produced by Pigment & Chemical Corporation, Mogadore, OH, U.S.A.): 0.5 parts
  calcium carbonate (mean particle size about 10.0 microns, ranging from 2.5 to 25 microns): 50 parts Composition C:
Same as Composition A Composition D:
  polyvinyl chloride dispersion resin (Geon 121, Inherent Viscosity, ASTM D-1243-66 of 1.2, produced by B. F. Goodrich, Chemical Group.): 70 parts
  polyvinyl chloride blending resin (Pliovic M-70, Inherent Viscosity, ASTM D-1243 Method A of 0.90, produced by Goodyear Tire & Rubber Co.): 30 parts
  butyl benzyl phthalate: 43 parts
  2,2,4-Trimethyl-1,3-pentanediol Diisobutyrate: 12 parts
  barium, cadmium, zinc phosphite heat stabilizer (Polystab 375): 2.5 parts
  calcium carbonate (mean particle size 10.0 microns, ranging from 2.5 to 25 microns.): 75 parts Composition E:
  polyvinyl chloride dispersion resin (Geon 121, Inherent Viscosity, ASTM 40 parts D-1243-66 of 1.2, produced by B. F. Goodrich, Chemical Group.) 40 parts
  polyvinyl chloride dispersion resin (Geon 123, Inherent Viscosity, ASTM D-1243-66 of 1.00, produced by B. F. Goodrich, Chemical Group.): 40 parts
  polyvinyl chloride blending resin (Pliovic M-70, Inherent Viscosity, ASTM D-1243 Method A of 0.90, produced by Goodyear Tire & Rubber Co.): 20 parts
  butyl benzyl phthalate: 30 parts
  benzyl type phthalate blend (proprietary plasticizer, produced by Monsanto Co., St. Louis, Mo. as Santisizer 377.): 15 parts
  2,2,4-Trimethyl-1,3-pentanediol Diisobutyrate: 10 parts
  azodicarbonamide (Modidfied azodicarbonamide, produced by Uniroyal Chemical, Div. of Uniroyal Inc., Naugatuck, Conn., U.S.A., as Celogen AZ 3990.): 2 parts
  zinc oxide (Canfelzo 216, average particle size 0.23 microns, produced by Pigment & Chemical Corporation, Mogadore, OH, U.S.A.): 0.5 parts
  calcium carbonate (mean particle size 10.0 microns, ranging from 2.5 to 25 microns.): 50 parts Composition F:
  polyvinyl chloride dispersion resin (Geon 121, Inherent Viscosity, ASTM D-1243-66 of 1.2, produced by B. F. Goodrich, Chemical Group.): 50 parts
  polyvinyl chloride dispersion resin (Geon 179, Inherent Viscosity, ASTM D-1243-66 of 1.2, produced by B. F. Goodrich, Chemical Group.): 20 parts
  polyvinyl chloride blending resin (Pliovic M-70, Inherent Viscosity, ASTM D-1243 Method A of 0.90, produced by Goodyear Tire & Rubber Co.): 30 parts
  benzyl type phthalate blend (proprietary plasticizer, produced by Monsanto Co., St. Louis, Mo. as Santisizer 377.): 14 parts
  2,2,4-trimethyl-1,3-pentanediol benzoate isobutyrate (Nuoplaz 1046, produced by Nuodex, Inc. Piscataway, N.J., U.S.A.): 36 parts
  barium zinc stabilizer (Therm-Chek 130 produced by Ferro Corporation, Bedford, Ohio, U.S.A.): 2.5 parts
  epoxidized soy bean oil plasticizer (Plas-Chek 775, produced by Ferro Corporation): 5 parts All of the Compositions in this and all of the Examples used in the description of the present invention may be modified by the use of alternate or additional ingredients. Likewise, the quantities of ingredients used may be modified or ingredients eliminated altogether. The changes that are possible in order to achieve desired characteristics in the final product, operational efficiencies or cost benefits will be readily apparent to those skilled in the art.

I claim:

1. A base web for a surface covering product comprising two substantially parallel fiber glass webs each of which is impregnated with a resinous composition and spaced apart from the other by a core layer of expandable resinous composition and an integral layer of resinous composition positioned on each side of the core layer which separates the surfaces of the core layer from the impregnated fiber glass webs and adheres the impregnated fiber glass webs to the core layer.

2. A base web in accordance with claim 1 in which the fiber glass webs are comprised of randomly placed glass fibers having a length of between 0.75 and 1.5 inches, a diameter of between 10 and 13 microns and which are bound together by a binding material selected from the group of synthetic resins consisting of acrylic resins, polyvinyl resins, and ureaformaldehyde resins in an amount from to 12% to 25% by weight of the glass fibers.

3. A base web in accordance with claim 1 in which the resinous compositions are based on the resinous material polyvinyl chloride.

4. A base web in accordance with claim 2 in which the resinous compositions are based on the resinous material polyvinyl chloride and the core layer has a thickness from 0.010 inches to 0.030 inches and a blow ratio of from 1.2 to 1 to 4 to 1.

5. A base web in accordance with claim 4 in which the core layer contains a blowing system capable of expanding the core layer during exposure to heat which is sufficient to fuse the resinous compositions in the base web.

6. A base web in accordance with claim 5 in which the core layer contains azodicarbonamide and an accelerator therefor.

7. A surface covering product comprising:
(a) a base web in accordance with claim 1 in which the resinous compositions in the base web are fused and the core layer is expanded and fused;
(b) a layer of expanded and fused resinous composition adhered to the base web;
(c) a layer of fused resinous composition adhered to the top surface of the composite of (a) and (b).

8. A surface covering product comprising:
(a) a base web in accordance with claim 4 in which the resinous compositions in the base web are fused and the core layer is expanded and fused;
(b) a multilevel layer of an expanded, fused resinous composition adhered to the base web having a first portion which is expanded to a greater thickness than a second portion;
(c) decorative areas on the surface of the multilevel layer;
(d) a layer of a translucent or clear fused resinous composition adhered to the multilevel layer.

9. A surface covering product in accordance with claim 8 in which the resinous compositions are based on the resinous material polyvinyl chloride.

10. A surface covering product in accordance with claim 9 in which the multilevel layer contains thermal decomposition products of azodicarbonamide and an accelerator therefor.

11. A surface covering product in accordance with claim 10 in which the second portion of the multilevel layer has been in contact with an expansion inhibitor which caused the second portion to expand to a lesser thickness than the first portion of the multilevel layer.

12. A surface covering product in accordance with claim 11 in which the inhibitor is selected from the group consisting of fumaric acid, trimellitic anhydride and tolyltriazole.

13. A surface covering product in accordance with claim 12 in which the inhibitor is tolyltriazole.

14. A surface covering product in accordance with claim 9 which contains a smoothing layer of resinous composition between the base web and the multilevel layer.

15. A process for producing a base web for a surface covering product which comprises:
(a) impregnating a first fiber glass web with a resinous composition and gelling the resinous composition;
(b) applying a first barrier coat of resinous composition to one surface of the impregnated first fiber glass web and gelling the first barrier coat;
(c) applying a layer of expandable resinous composition to the surface of the gelled first barrier coat and gelling the expandable resinous composition;
(d) applying a second barrier coat of resinous composition in a liquid state to the top surface of the gelled expandable resinous composition;
(e) impregnating a second fiber glass web with a resinous composition and gelling the resinous composition;
(f) placing the impregnated second fiber glass web into intimate contact with the second barrier coat while in the liquid state, and gelling the second barrier coat to adhere the impregnated second fiber glass web to the composite web produced by the steps (a) through (d).

16. A process for producing a base web for a surface covering product in accordance with claim 15 in which steps (e) and (f) are performed by placing the second fiber glass web into intimate contact with the second barrier coat while in the liquid state so that the composition of the second barrier layer impregnates the second fiber glass web and forms an integral layer between the gelled expandable resinous layer and the impregnated second fiber glass layer and gelling the liquid resinous composition.

17. A process in accordance with claim 15 or 16 in which the first and the second fiber glass webs are comprised of randomly placed glass fibers having a length of between 0.75 and 1.5 inches, a diameter of between 10 and 13 microns and which are bound together by a binding material selected from the group of synthetic resins consisting of acrylic resins, polyvinyl resins, and ureaformaldehyde resins in an amount from to 12% to 25% by weight of the glass fibers, having a total weight ranging from 1 ounce per square yard to 1.77 ounces per square yard, and are positioned so that the machine direction of the first and second fiber glass webs are parallel to each other.

18. A process in accordance with claim 17 in which the resinous compositions are based on the resinous material polyvinyl chloride.

19. A process in accordance with claim 18 in which the expandable resinous composition contains azodicarbonamide and an accelerator therefor.

20. A process in accordance with claim 18 in which the steps (a) and (b) are performed by coating one surface of the first fiber glass web with a resinous composition in a liquid state, said composition having a viscosity that allows the composition to penetrate through at least a portion of the first fiber glass web while leaving sufficient composition on the surface of the web to form an integral layer when the liquid resinous composition is gelled.

21. A process in accordance with claim 20 in which the resinous composition applied to one surface of the first fiber glass web penetrates at least 80% of the thickness of the fiber glass web while maintaining the other surface of the first fiber glass web sufficiently dry to permit passage of the impregnated web over transport rollers with substantially no transfer of resinous material to the transport rollers.

22. A process in accordance with claim 20 in which gelling of a composite resinous composition impregnated fiber glass web and barrier coat is performed by placing the surface of the barrier coat of the composite web into a heated smooth surface and delivering sufficient heat from the smooth surface to the composite web to gel the resinous compositions.

23. A process in accordance with claim 18 in which the steps (a) and (b) are preformed by positioning the fiber glass web in a body of resinous composition in a liquid state so as to cause the liquid resinous composition to occupy the interstices of the fiber glass web and then removing the fiber glass web from the body of resinous composition along with the resinous composition contained in the intersticies of the web and the resinous composion that accompanies the web on the surfaces thereof and then removing excess resinous composition from the surfaces of the web and placing one side of the impregnated web on a heated smooth surface to form the first barrier layer and delivering sufficient heat from the smooth surface to gel the resinous composition comprising the impregnant of the first fiber glass web and the first barrier coat.

24. A process in accordance with claim 15 or 16 which comprises the additional steps:
(g) applying a second expandable layer of resinous composition on the surface of the second resinous impregnated fiber glass web;
(h) gelling the second expandable resinous composition;
(i) applying a top surface of resinous composition;
(j) exposing the composite web produced by steps (a) through (i) to uniform heating conditions to fuse each layer thereof containing a resinous composition and to expand each layer thereof containing a blowing system.

25. A process in accordance with claim 24 in which the resinous compositions are based on the resin polyvinyl chloride.

26. A process in accordance with claim 25 in which the expandable layers contain a blowing system comprising azodicarbonamide and an accelerator therefor.

27. A process in accordance with claim 25 in which areas of decoration are placed on the composite web produced after step (f) and before step (j).

28. A process in accordance with claim 26 in which areas of decoration are placed on the gelled second expandable layer formed by step (h).

29. A process in accordance with claim 27 in which a portion of the areas of decoration contains an expansion inhibitor which penetrates into the composition of the second expandable layer during the uniform heating that causes expansion and fusion of the second expandable layer, said expansion inhibitor altering the amount of expansion of the second expandable layer that takes place in the portion of the areas of decoration containing the expansion inhibitor in contrast with the amount of expansion that takes place in the remaining portions of the areas of decoration containing no expansion inhibitor.

30. A process in accordance with claim 29 in which the expansion inhibitor is selected from the group consisting of fumaric acid, trimellitic anhydride and tolytriazole.

31. A process in accordance with claim 30 in which the expansion inhibitor is tolyltriazole.

32. A process in accordance with claim 29 which comprises the additional steps of:
(k) applying a layer of adhesive to the bottom side of the composite web produced by steps (a) through (j); and,
(l) applying a means to protect the adhesive during a period of storage prior to use.

33. A process in accordance with claim 29 which comprises the additional step:
(m) cutting the composite web produced by steps (a) through (j) into a plurality of individual pieces.

34. A process in accordance with claim 32 in which the protective means of step (1) comprises release paper.

35. A process in accordance with claim 28 which comprises the additional step:
(n) applying a smoothing layer of resinous material between the resinous impregnated second fiber glass web and the second expandable layer of resinous composition.

36. A process in accordance with claim 35 in which the resinous composition of step (n) is based on the resinous material polyvinyl chloride.

* * * * *